Aug. 23, 1960 A. P. DOUGLAS ET AL 2,949,990
BRAKE AND DRIVE MECHANISM FOR A SIDEWALK BICYCLE
Filed March 7, 1958 3 Sheets-Sheet 1

INVENTORS
ALVIN P. DOUGLAS
ALBERT R. GOLRICK
BY Golrick & Golrick
ATTORNEYS

Aug. 23, 1960   A. P. DOUGLAS ET AL   2,949,990
BRAKE AND DRIVE MECHANISM FOR A SIDEWALK BICYCLE
Filed March 7, 1958   3 Sheets-Sheet 2

INVENTORS
ALVIN P. DOUGLAS
ALBERT R. GOLRICK
BY Golrick & Golrick
ATTORNEYS

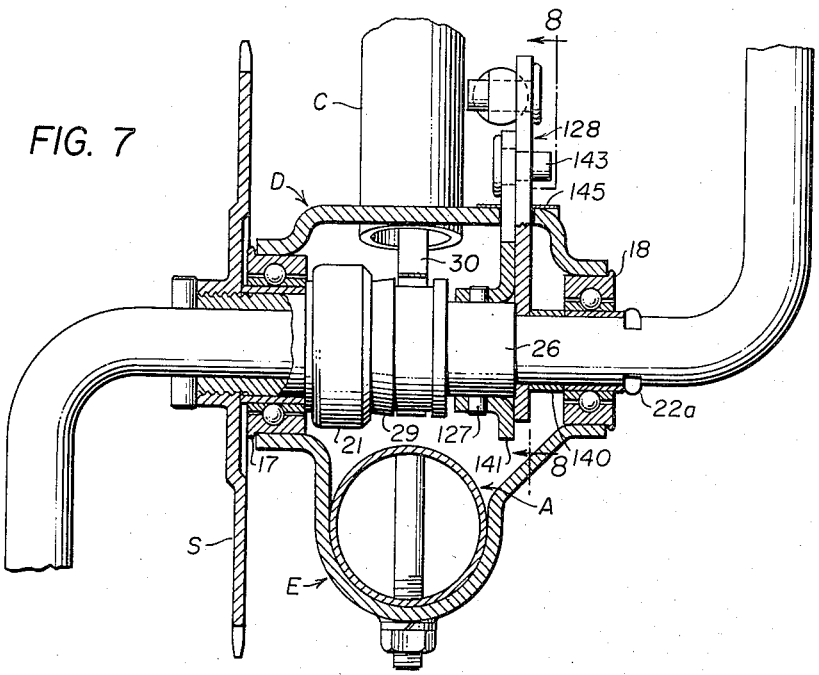
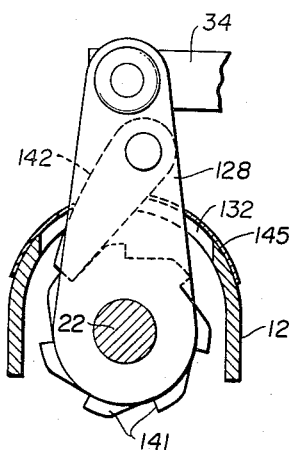

United States Patent Office 2,949,990
Patented Aug. 23, 1960

2,949,990

BRAKE AND DRIVE MECHANISM FOR A SIDEWALK BICYCLE

Alvin P. Douglas, Nashville, Tenn., and Albert R. Golrick, Cleveland Heights, Ohio, assignors to The Murray Ohio Manufacturing Company, Nashville, Tenn., a corporation of Ohio Filed Mar. 7, 1958, Ser. No. 719,800

7 Claims. (Cl. 192—5)

This invention is directed to improvements in sidewalk or park bicycles and has for its general object the provision of such a bicycle equipped with a crank hanger drive and brake mechanism of the free wheeling type which can be incorporated in the bicycle at the hanger hub and in braking action be effective upon the tire of the rear wheel of the bicycle, as distinguished from rear wheel hub coaster brake mechanisms.

Heretofore it has been the practice to equip sidewalk or park bicycles with the customary rear wheel hub coaster brake mechanisms wherein the braking is effected by an expandable brake sleeve bearing against the interior of the hub. However such coaster brakes, while efficacious, have become too expensive for use in sidewalk bycycles of sixteen to twenty inch diameter wheels which are of a lower price range than standard wheel and frame bycycles.

The specific object of the present invention is to provide a free wheeling brake mechanism for small bicycles wherein the braking action is effected upon the tire of the rear wheel of the park cycle in such manner that economies of manufacture over present practices may be effected.

A further object of the invention is to provide a free wheeling brake mechanism for small bicycles which will permit back-wheeling of the bicycle when the rider is not mounted thereon.

Other objects of the invention will become apparent to those skilled in the art from the disclosures hereinafter set forth and the essential characteristics thereof are summarized in the claims.

In the drawings:

Fig. 7 is a view corresponding generally in location to that of Fig. 3 for a modification of the invention; and Fig. 8 is a detailed view partly in section taken as indicated by line 8—8 in Fig. 7.

Figure 1:
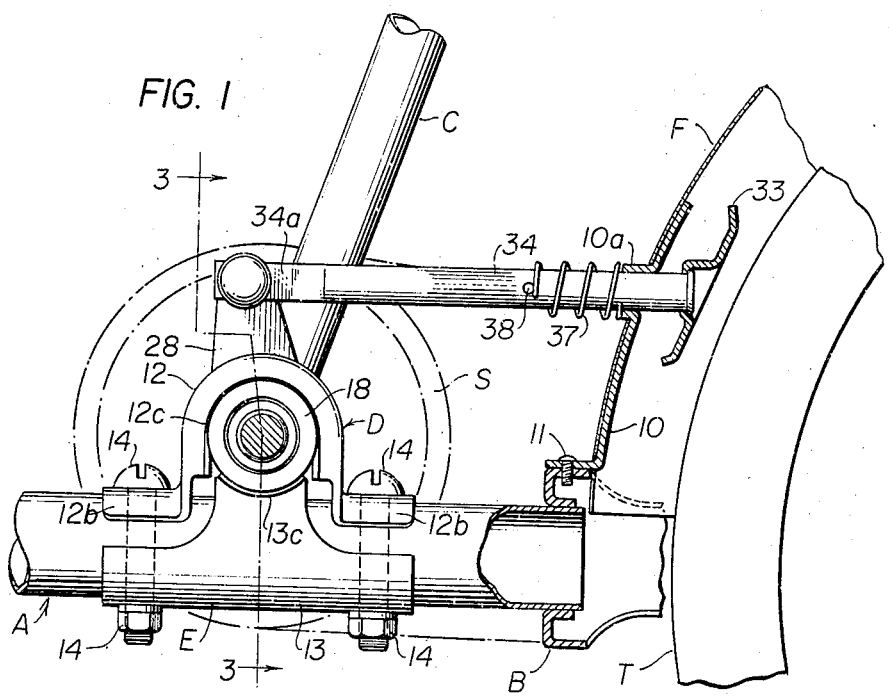
Fig. 1 is a fragmentary view of the left side of a sidewalk bicycle embodying one form of the present invention with certain parts being broken away for clarity of representation.
Figure 2:
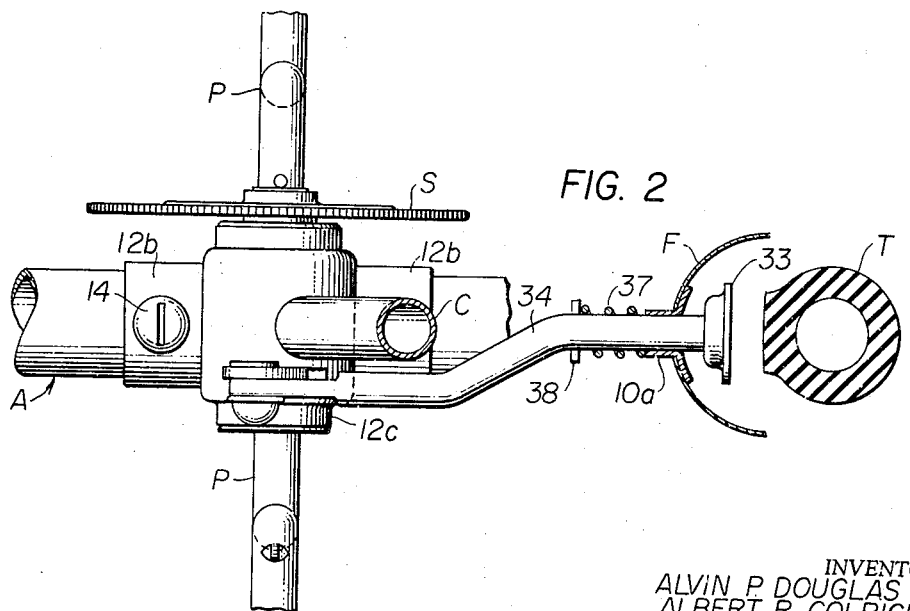
Fig. 2 is a plan view corresponding generally to Fig. 1.

In the drawings there are shown in fragmentary form certain parts of a sidewalk or park bicycle comprising the immediate environment of the present invention all indicated by general reference letters. These are a longitudinal main frame member A carrying at its back end a fork member B between the arms of which there is mounted in conventional fashion a rear wheel with tire T sprocket chain driven from sprocket S on a pedal crank member P; the rear fender F; an upwardly extending rearwardly inclined seat mast tube C bolted through its integrally attached clamp member D to the top of frame member A; and a second clamp member E on the bottom side of member A, cooperating with the opposed clamp member D to support a major assembly of the pedal crank member P and associated mechanism and crank hanger bearing housing or hub as hereinafter described.

Not shown since well known and not comprising a part of the instant invention are the front steering wheel and steering fork assemblies carried by a head post tube at the end of the front part of member A curved upwardly from the horizontal rear part appearing in Fig. 1. Omitted for like reasons are the conventional upper rear fork running from the top of the seat mast tube down to the rear wheel axle at the back end of fork B, and the usual U-shaped fender bracket running from the rear axle region rearwardly to the back of the fender. However, there is shown a fender anchor member 10 in the form of a bracket curved vertically and transversely to conform to the inner surface form of the front end of fender F thereto secured, and having on its lower end a forwardly projecting ear secured on the top of the yoke of the fork member B by a self-tapping screw 11. Bracket member 10 is secured to the fender by rivets, spot-welding or other apt means. An aperture formed in the upper region of bracket member 10 is surrounded by an integrally formed, drawn cylindrical flange 10a projecting forwardly through a corresponding aperture in the fender to provide a bushing slideably supporting the back end of a brake shoe supporting rod 34 for reciprocation in the rear wheel plane of rotation, whereby the brake shoe element 33, secured on the end of the rod under the fender, is brought into braking engagement with the rear wheel tire T by mechanism to be described.

Generally speaking the clamp means is part of the hanger housing or hub structure whereby the lower end of mast tube C, and the assembly of pedal crank member P with associated braking and drive mechanism are supported in the frame, and is similar to that of Patent No. 2,798,739 issued July 9, 1957.

The upper clamp member D has an inverted U-shaped trough-like body 12 disposed transversely across frame member A with similar downwardly concave arcuate formations or lugs 12b extending fore and aft from the bottoms of the vertical faces of the body, the lugs 12b being curved to embrace the top of the frame tube A over about a quadrant extent. The opposite ends of the body are necked or drawn down to inverted U-shaped flanges 12c forming upper seats conformed to and semi-circularly embracing outer races of the respective pedal crank bearing units 17, 18 and each having straight side portions extending below the center-line of the bearings. The open lower end of seat mast tube C projects slightly through, and is welded or brazed into, an aperture formed in the curved top region of the body 12 at a location lying in the vertical longitudinal center plane of the bicycle but displaced somewhat to the rear of the vertical axial plane of symmetry of the body, as best seen in Fig. 1.

The bottom clamp member E includes an elongated generally semi-cylindrical body portion 13 semi-circumferentially embracing the frame member A from the bottom and centrally located upwardly extending side ears which in the region at or just above tube member A are provided with respective upwardly concave outward flanges 13c serving as arcuate lower seats about a quadrant in extent for the pedal crank bearing units 17, 18.

Fasteners 14, 14 such as bolts, passed through diametric paired apertures in frame tube member A, and corresponding apertures in upper clamp lugs 12b and in the end regions of the lower clamp body and secured by lock washers and nuts, serve to secure the mast tube C to frame member A and to clamp the outer races of bearing units 17, 18 between members D, E, hence to rotatably mount the pedal crank member P.

The clamp members D and E are shown as each symmetrical in general form about a vertical plane through the rotation axis of the pedal crank member P. As the outer bearing races of 17, 18 are of slightly different diameter, the corresponding seat formations of each clamp member have different radii of curvature although of course, all seats are mutually coaxial in final disposition.

Figure 3:
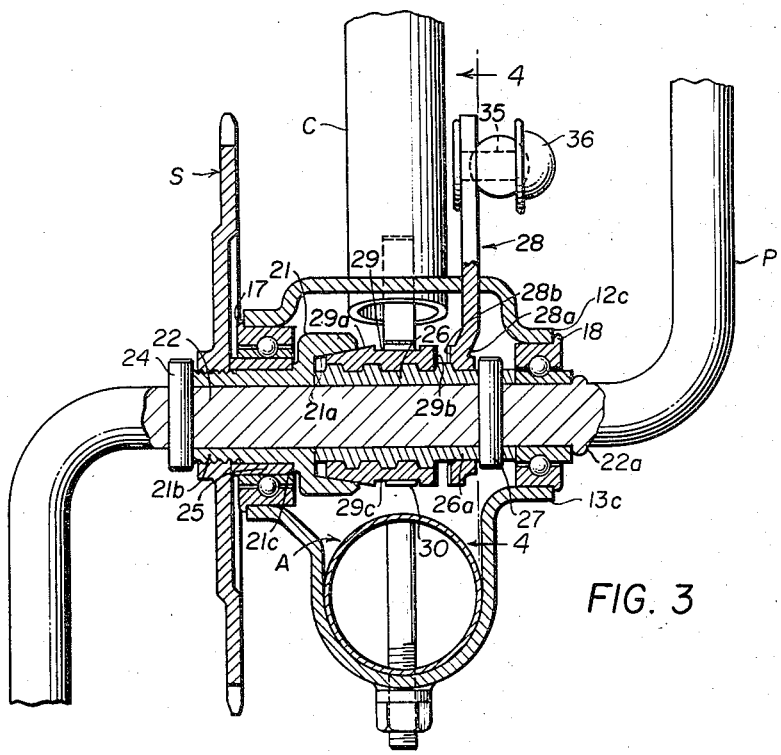
Fig. 3 is substantially a fragmentary transverse sectional view taken generally as indicated by the line 3—3 in Fig. 1.

Within the hub or housing formed by the body of clamp member D, there are mounted, on the straight central axle portion 22 of the pedal crank member P, the principal elements of a cone clutch type free-wheeling drive clutch mechanism and a brake actuating mechanism, at the right and left sides of the bicycle (left and right side of Fig. 3, respectively). For convenience hereinafter the terms of left and right will be used as applying to Fig. 3. These elements are a driven cone clutch member 21 and the externally threaded sleeve 26, through both of which the axle part 22 of the crank extends, an internally threaded sleeve nut 29 threadably or cammingly engaged on sleeve 26, to shift toward the left as a driving clutch member and to the right as a brake actuating element upon clutching engagement with a brake lever arm 28, and a nut drag or retarding spring 30. The brake lever arm 28 extends upwardly and outwardly through a slot 32 formed in the housing member D adjacent the mast tube C.

The inboard head or enlargement of the driven clutch sleeve member 21 has a counterbored or hollow end resulting in an axial circular flange having a short internal female cone surface 21a cooperative with a short conical taper 29a as a driving cone clutch surface on the left end of nut member 29, while the tubular portion 21b extending through the inner race of antifriction bearing unit 17 is threaded on its outer end to receive the correspondingly threaded hub portion of chain driving sprocket S. A short series of knurls may be formed in the male taper surface at each of a pair of diametrically spaced locations. A spacer sleeve 25 which may be forced-fitted into or integral with the inner race of unit 17, is axially clamped between a shoulder 21c, axially spaced slightly from the head of clutch member 21, and the hub region of sprocket S, to assure running clearance between the fixed outer face of unit 17 and the adjacent parts of sprocket and member 21. The sprocket is rotationally fixed on the sleeve by a pin driven lengthwise into the threaded region or other apt means.

Thus the driven or female clutch member 21 and sprocket S rotate together, and also are axially fixed with respect to the bearing unit 17, while the bore in tubular portion 21b immediately journals the left side of axle 22. The ends of pin 24 projecting out of a diametric bore in axle 22 engage the outer end of member 21 as a reaction abutment therefor under the axle thrust developed in clutch engagement.

The male threaded sleeve 26 is secured to axle 22 by a diametric pin 27 at its right end, the projecting ends of the pin serving as a reaction abutment for the outer face of the hub 28a of brake lever 28, which is supported for slight axial shift and relative rotational or pivotal motion on a cylindrical surface 26a extending to the right beyond the male threads of sleeve 26 so that the lever pivot is coaxial with the crank rod. A slight running clearance is provided endwise between sleeve 26 and adjacent end region of member 21. For the location of the sprocket S as shown, and the consequent placement of the other parts, corresponding right hand threads are provided on the sleeve and nut, preferably triple threads or helical camming surfaces.

It may be here noted that with the inner race of bearing unit 18 axially secured on axle 22 between the end of the fixed sleeve 26 and a plurality of outside nibs 22a staked out of the surface of axle 22, the crank axle is fixed with respect to the bearing unit 18. Also peripheral flanges or rims at the outer regions of the bearing units engaging the end edges of the bearing seat formations of the housing clamps prevent inward displacement of the bearings.

Figures 4, 5, 6:
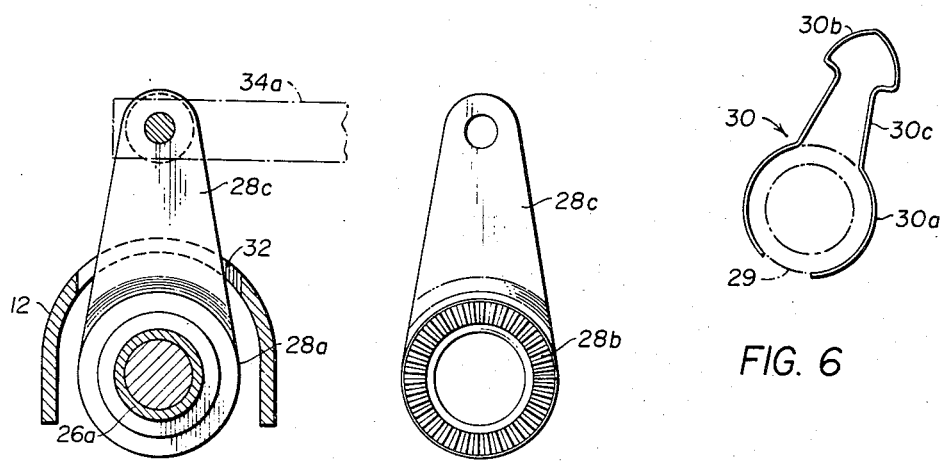
Fig. 4 is a detailed sectional view taken as indicated by the line 4—4 in Fig. 3.
Fig. 5 is a detail of the inner face of a lever arm with brake actuating mechanism.
Fig. 6 is a detailed view of a drag spring element.

The nut member 29 has a roughly central circumferential shallow flat groove 29c, embraced by the arcuate free ends 30a of the drag spring 30, the form of which is seen in Fig. 6. Spring 30 is of flat strip spring stock, caliper-like in form, the free ends 30a being formed at the ends of straight arms 30c integrally connected by a wedge shaped yoke or anchoring portion 30b, whereby the spring is received and wedged in the inner open end of mast tube C. The right end face of nut member 29 is provided with an annular knurled formation 29b (90° knurls) cooperating with a like formation 28b on the left face of hub region 28a of lever 28 seen in Fig. 5. The hub region of the latter is offset from the outer part 28c of the arm projecting through the arcuate slot 32 in the top of housing or hub member 12, for space consideration.

Thus with the yoke portion 30b of the drag spring inserted into the tube C, the spring is rotationally fixed, yet may swing about the opposed corners of the yoke as the nut member shifts axially, with the freedom permitted by the difference between the spring stock and groove widths.

The flatted forward end 34a of the brake rod 34 is pivotally secured by a pivot rivet 35 fixed in the outer end of brake arm 28, and thereon held by a retainer or nut 36. The rod has a double bend to result in parallel offset front and rear portions as required by the lateral displacement of the lever arm 28 from the rod reciprocation and rear wheel rotation plane. As additional assurance that the brake shoe 33 will be retained in position retracted from the tire, a light compression spring 37 may be interposed about the brake rod between the front edge of the flange 10a of the bracket 10 and a transverse pin 38 through the rod.

On forward pedalling (counterclockwise in Fig. 1), the nut member, retarded by the spring 30 relative to the axle, moves to the left bringing the cone clutch members into driving engagement whereby the pedal crank P, threaded sleeve 26, nut 29, member 21 and sprocket S rotate in unison to drive the rear wheel through the chain. Upon coasting of the bicycle with pedals stationary, the chain and sprocket S continue in motion, thereby initially turning nut 29 relative to the sleeve 26 to cause it to back off slightly for clutch disengagement and thereby permit freewheeling.

Upon back-pedalling, the nut being rotationally retarded is shifted farther to the right to bring the annular knurl clutch formations of the nut end and opposed brake arm hub into brake actuating engagement and the brake arm into bearing axially against pin 27. Thereupon the lever arm 28 is swung to push brake rod rearwardly for bringing the shoe 33 into braking engagement with the rear wheel tire, with the braking force controlled by the backward force applied to the impeded pedals. The tangential forces of the braking action are taken by the bracket 10 and transferred to the frame at 11. Upon subsequent forward motion of the pedals, not only is braking force released, but also the nut is released from brake arm engagement to a coasting position or into driving engagement of the clutch members, depending upon the extent of pedal motion. Even lacking spring 37, the brake shoe is carried forward away from the tire, upon forward motion of the pedals, before the knurl clutch engagement is released.

It is to be observed that when the bicycle is moved rearwardly, i.e. on back-wheeling, the brake is not thereby brought into engagement, for the attendant reverse motion of the sprocket S and member 21 cannot be communicated to the lever arm 28. If the clutch elements are not engaged no motion is derived from member 21; on the other hand, although the clutch is engaged at the moment reverse movement of the sprocket is begun, the derived rearward motion of the nut member 29 being the same sense of rotationed motion relative to sleeve 26 as prevails on forward pedalling, the clutch sleeve is maintained in engaged position with nut 29 completely disengaged from the brake arm. It may be here noted that axially directed thrusts, developed in driving clutch engagement or in brake clutching engagement, are ineffective to displace the bearing units relative to axle or frame, since in the first case the reaction abutments are the pins 24 and 27 axially fixed in 22, and in the second case pin 27 and nibs 22a, likewise axially fixed at 22a.

The described structure is simply assembled. Either straight rod stock, or stock partially formed into a pedal crank on one half, is drilled at the proper locations for pins 24 and 27, and nibbed at 22a. Then bearing unit 18, sleeve 26 with lever arm 28 already in place thereon, and a subassembly of member 21, sleeve 25, bearing unit 17 and sprocket S, are successively slipped onto the rod into position on the axle portion 22. Taper pins 27 and 24 are then driven into place. Thereupon the pedal crank arm outboard of sprocket S, or both arms, are formed by bending, and any remaining work on the pedal crank is done, such as assembling pedals thereon in appropriate fashion. The entire resulting major subassembly is then positioned above frame member A, the upper clamp member D with attached mast tube C, is positioned over the subassembly with arm 28 extending through slot 32 and retarding spring in place and the upper and lower clamps D, E are bolted into place with the bearing units 17, 18 clamped between the respective opposed pairs of seat formations of the clamp members. The brake rod 34 and associated structures, positioned either before or after clamping of the major pedal assembly, is then connected to the lever arm 28 by rivet 35 and fastener 36.

In the modification shown in Figs. 7 and 8, the general arrangement of clamp members D and E, bearings, sprocket, female or driven cone member, male threaded sleeve, the nut element carrying the male cone surface, and the nut drag spring are generally similar to those previously described with, however, modification of the shape of the clamping members to accommodate the changed form of brake actuating mechanism now described. Similar elements are designated by corresponding reference letters or numerals.

The nut member 29 may be substantially identical with that previously described omitting, however, the knurled end clutch formation. The threaded male sleeve member 26 here has a shorter thread or helical camming length and a longer cylindrical portion. The brake lever arm 128 is axially located and journalled directly upon the straight axle portion 22 of the crank rod between the end of member 26 and a spacer collar or sleeve 140 abutting the inner race of the bearing 18. The lever arm in this case is flat and simply apertured in the hub region for the axle 22 with no knurl or offset. Inward of the lever arm a seven lobe ratchet member 141 with a drawn cylindrically flanged hub portion is secured by a pin 127 driven through the cylindrical flange hub portion, the male threaded sleeve and the crank axle. The ratchet 141 cooperates with a pawl 142 pivotally secured flat on the inner face of the lever arm 128a by a pivot rivet 143 at a point outside of the housing formed by member D. In this case, since the housing slot 132 must also accommodate the thickness of lever 141 and the pawl 142 and accordingly is of relatively greater width, preferably a sliding dust cover 145 less than semi-cylindrical in form and conforming to the top arch of the member D, is provided to move with the lever and pawl assembly but at all times to overlap the slot 132. The brake rod is secured to lever 128 as before, and here there is greater utility, even need for a brake rod return spring such as shown in Fig. 1 as merely preferable.

Manipulation of the pedals for driving, coasting and braking is the same as in the first form, with the manner of operation of the drive clutch on driving or coasting the same as described for the first firm. The ratchet teeth or lobes, as may be seen in Fig. 8, and the point of pawl suspension are such that on forward pedalling the pawl rides over the lobes without engagement. Upon back pedalling the drive clutch is released; and the pawl engages the straight face of one of the lobes and the lever 128 and attached brake rod are moved rearwardly for rear wheel braking as described for the form of Figs. 1–6. Upon subsequent forward pedal motion braking force is released, and the brake rod return spring clears the shoe from the tire.

The manner of assembly of the bearing units, clutch and brake actuating elements is generally the same as for the first form.

We claim:

1. In a park cycle, a park cycle brake and crank hanger drive of the free wheeling and brake shoe type comprising a transversely split two-part hanger hub construction on the park cycle frame, a single piece crank hanger rod, said hub construction supporting bearing units which support the crank rod, a clutch sleeve rotatable on the single piece crank hanger rod with a journaled portion extending into the hub construction, a chain sprocket fixed on the outer end of the clutch sleeve, one of said bearings being disposed between the clutch sleeve and the hanger hub construction, a clutch formation on the inner part of the sleeve within the hub construction of greater diameter than the diameter of the clutch sleeve, a second sleeve on the crank hanger rod fixed to the rod and having a helical cam formation, a clutch member having a cylindrical surface defined by two spaced apart shoulders riding on the second sleeve and actuated by the helical cam formation of the second sleeve into engagement with said clutch formation to clutch the crank hanger rod to the sprocket on forward drive, a friction drag spring acting on the cylindrical surface of the clutch member between the shoulders to retard rotation of the riding clutch member, a brake lever pivotally mounted coaxially of the crank hanger rod within and extending upwardly and outwardly through the hanger hub construction, a connecting rod pivotally connected to the brake lever, a second clutch mechanism within the hanger hub construction actuatable to connect the brake lever arm to the crank hanger rod upon a reverse braking movement of the hanger rod, and a brake shoe carried by the connecting rod for shifting rearwardly into braking action upon the rear tire of the park cycle upon reverse braking movement of the hanger rod.

2. In a park cycle, a park cycle brake and crank hanger drive of the free wheeling and brake shoe type comprising a transversely separate two part hanger hub construction on the park cycle frame including upper and lower parts; in clamped engagement with the cycle frame, a single piece straight crank hanger rod, said hub construction supporting bearing units which support the crank rod, a clutch sleeve journaled and rotatable on the rod extending into the hub construction, a chain sprocket fixed on the clutch sleeve, one of said bearings being disposed between the clutch sleeve and the hanger hub construction, a clutch formation on the inner part of the sleeve within the hub construction, a second sleeve on the crank hanger rod fixed to the rod and having a right hand helical cam formation, a clutch member riding on the second sleeve having a cylindrical surface bounded by two spaced apart shoulders and actuated by the helical cam formation of the second sleeve to clutch the crank hanger rod to the sprocket on forward drive, a friction drag spring of caliper-like form attached to one of the two parts of the hanger hub construction and having arms acting on the cylindrical surface of the clutch member to retard rotation of the clutch member, a brake lever pivotally mounted coaxially of the crank hanger rod and extending upwardly and outwardly through the upper part of the hanger hub construction, a second clutch mechanism within the hanger hub construction actuatable to connect the brake lever arm to the crank hanger rod upon a reverse braking movement of the hanger rod, a connecting rod pivotally connected to the brake lever arm, said clutch mechanisms, bearings and lever being mounted on the center region of the rod before the rod is bent to form pedal crank arms, and a brake shoe actuated rearwardly by the connecting arm to shift the shoe into braking action upon the rear tire of the park cycle.

3. In a park cycle, a park cycle brake and crank hanger drive of the free wheeling and brake shoe type comprising a hanger hub construction on the park cycle frame formed in two horizontally transversely separate parts in clamped engagement with the cycle frame, a seat post mast tube fixedly connected endwise to and opening through an upper one of the two parts, a single piece crank hanger rod, said hanger hub construction supporting bearing units which support the crank rod, a journaled clutch sleeve rotatable on the rod extending into the hub construction, a chain sprocket fixed on the clutch sleeve, a clutch formation on the inner part of the sleeve within the hub construction of greater diameter than the diameter of the sleeve, a second sleeve on the crank hanger rod fixed to the rod and having a helical cam formation, a clutch member riding on the second sleeve and actuated by the helical cam formation of the second sleeve to clutch the crank hanger rod to the sprocket on forward drive, a friction drag spring acting on the clutch member to retard rotation of the clutch member, said drag spring being held in the end of the mast tube, a brake lever arm pivotally mounted coaxially of the crank hanger rod within and extending upwardly and outwardly through the hanger hub construction laterally adjacent the mast tube, the brake lever arm being adapted to be connected to the crank hanger rod upon a reverse braking movement of the hanger rod, a connecting rod pivotally connected to the brake lever arm, said connecting rod extending toward the rear wheel and having a back portion offset into substantially the plane of wheel rotation, and a brake shoe centered in the said plane forward of the rear wheel and rearwardly actuated by the connecting rod to shift the shoe into braking action upon the rear tire of the park cycle.

4. In a park cycle, a park cycle brake and crank hanger drive of the free wheeling and brake shoe type comprising a single piece pedal crank rod, a bearing housing adapted to be mounted on the upper side of a horizontal section of a lower part of the lower front reach bar of a park cycle frame, said single piece pedal crank rod being supported by the bearing housing, a chain sprocket independently rotatively supported on the pedal crank rod, a clutch sleeve on the crank rod, a bearing unit between the sleeve and the housing supported by the housing, said sleeve having a clutch formation disposed within the housing, a second sleeve on the crank hanger rod fixed to the rod and having a helical camming formation, a clutch member riding on the second sleeve and actuated by the helical cam formation of the second sleeve for clutching action in either direction of crank rod rotation, a brake lever having a hub pivotally mounted on the second sleeve, the hub of the lever being formed to constitute a clutch element, said brake lever extending upwardly through a slot formed in the bearing housing, a brake rod pivotally connected to the outer end of the brake arm and extending rearwardly of the housing, the rear portion of the rod being offset into the plane of the rear wheel rotation, a brake rod supporting and rear fender supporting bracket adapted to be mounted on the park cycle frame to the rear of said housing adjacent the rear fender of the park cycle and slidably guiding the offset portion of the rod, and a brake shoe on the rear end of the rod adapted to bear on the rear wheel tire of the park cycle.

5. In a park cycle, a park cycle brake and crank hanger drive of the free wheeling and brake shoe type comprising a transversely split two-part hanger hub construction on the park cycle frame with one of the parts carrying a mast tube, a single piece crank hanger rod, said housing supporting bearing units which support the crank rod, a clutch sleeve rotatable on the rod extending into the hub construction, a chain sprocket fixed on the clutch sleeve one of said bearings being disposed between the clutch sleeve and the hanger hub construction, a clutch formation on the inner part of the sleeve within the hub construction of greater diameter than the diameter of the clutch sleeve, a second sleeve on the crank hanger rod fixed to the rod and having a helical cam formation, a clutch member riding on the second sleeve and actuated by the helical cam formation of the second sleeve to clutch the crank hanger rod to the sprocket on forward drive, a caliper-like drag spring embracing and acting on the clutch member to retard rotation of the clutch member, said drag spring having a portion received in the lower end of the mast tube, a brake lever pivotally mounted coaxially of the crank hanger rod and extending upwardly and outwardly through the hanger hub construction, said lever being operable upon a reverse braking movement of the hanger rod, a rearwardly extending brake rod and a brake shoe on the brake rod actuated by the brake rod to shift the shoe rearwardly into braking action upon the rear tire of the park cycle.

6. In a park cycle, a park cycle brake and crank hanger drive of the free wheeling and brake shoe type comprising a transversely separate two-part hanger hub construction on the park cycle frame with an upper one of the parts carrying a seat post mast tube having its lower end open interiorly to the hub construction, a single piece crank hanger rod, said housing supporting bearing units which support the crank rod, a clutch sleeve rotatable on the rod extending into the hub construction, a chain sprocket fixed on the clutch sleeve, one of said bearings being disposed between the clutch sleeve and the hanger hub construction, a clutch formation on the inner part of the sleeve within the hub construction, a second sleeve on the crank hanger rod fixed to the rod and having a helical cam formation, a clutch member riding on the second sleeve and actuated by the helical cam formation of the second sleeve to clutch the crank hanger rod to the sprocket on forward drive, a friction drag spring inserted in the lower end of said mast tube and acting on the clutch member to retard rotation of the clutch member, a brake lever pivotally mounted coaxially of the crank hanger rod and extending upwardly and outwardly through the hanger hub construction, clutch means for operatively connecting said hanger rod and said lever operable upon a reverse braking movement of the hanger rod to move the lever rearwardly, a rearwardly extending brake rod actuated by the lever, a supporting bracket for the brake rod attached to the bicycle frame and a brake shoe actuated by the brake rod to shift the shoe into braking action upon the rear tire of the park cycle.

7. In a park cycle, a crank hanger drive of the free wheeling and brake shoe type comprising an attached transversely separate two part hanger housing structure, one of the parts having a mast tube fixed thereto, a single piece crank member consisting of two crank arms and an axle portion extending through the hanger housing structure, a female cone clutch member disposed with and within the hanger housing structure and having a sleeve portion journaled upon the axle portion of the single piece crank member and said sleeve portion extending outwardly of the two part housing structure, a sprocket member fixed to the outer end of said sleeve portion, a radial bearing unit mounted on said sleeve intermediate the ends of the sleeve and clamped between the two parts of the hanger housing structure, a coarse threaded sleeve fixed to the axle part of the single piece hanger structure and disposed within the housing structure, a male cone clutch member in threaded engagement with the coarse threaded sleeve fixed on the axle portion of the crank member thereby to form a riding clutch member for clutching the crank hanger axle to the sprocket through said sleeve on the female cone clutch member, a drag spring having an anchoring portion disposed within the lower region of the mast tube and having a portion bearing upon the female cone clutch member, a second radial bearing unit on the axle part of the hanger member opposite to the sprocket side of the device and clamped in position by the two parts of the hanger housing, a brake operating lever journalled on said coarse threaded sleeve to swing about the axle portion of the crank hanger member and extending upwardly through a hanger housing part along side of the mast tube, clutching means within the hanger housing between the threaded sleeve and lever for connecting the brake operating lever to the axle portion of the hanger member upon a reverse pedalling of the hanger member, a connecting rod pivotally attached to the upper end of said brake lever, a brake shoe on the connecting rod disposed to engage the rear tire of the park cycle and a bracket extending above and supported on the lower rear fork structure of the park cycle for slidably supporting the rear end of the connecting rod with the brake shoe juxtaposed to said rear tire.

References Cited in the file of this patent

UNITED STATES PATENTS

| | | |
|---|---|---|
| 658,269 | Lloyd | Sept. 18, 1900 |
| 661,468 | Conrad | Nov. 6, 1900 |
| 675,389 | Keating | June 4, 1901 |
| 1,382,902 | Giaugue | June 28, 1921 |
| 1,440,017 | Koechlin | Dec. 26, 1922 |
| 2,186,816 | Bernier | Jan. 9, 1940 |
| 2,793,727 | Boucher | May 28, 1957 |
| 2,798,739 | Schreckengost et al. | July 9, 1957 |